Jan. 12, 1971 G. E. RAUTH 3,553,949
APPARATUS FOR GATHERING CROPS FROM TREES
Filed Jan. 29, 1968 8 Sheets-Sheet 1
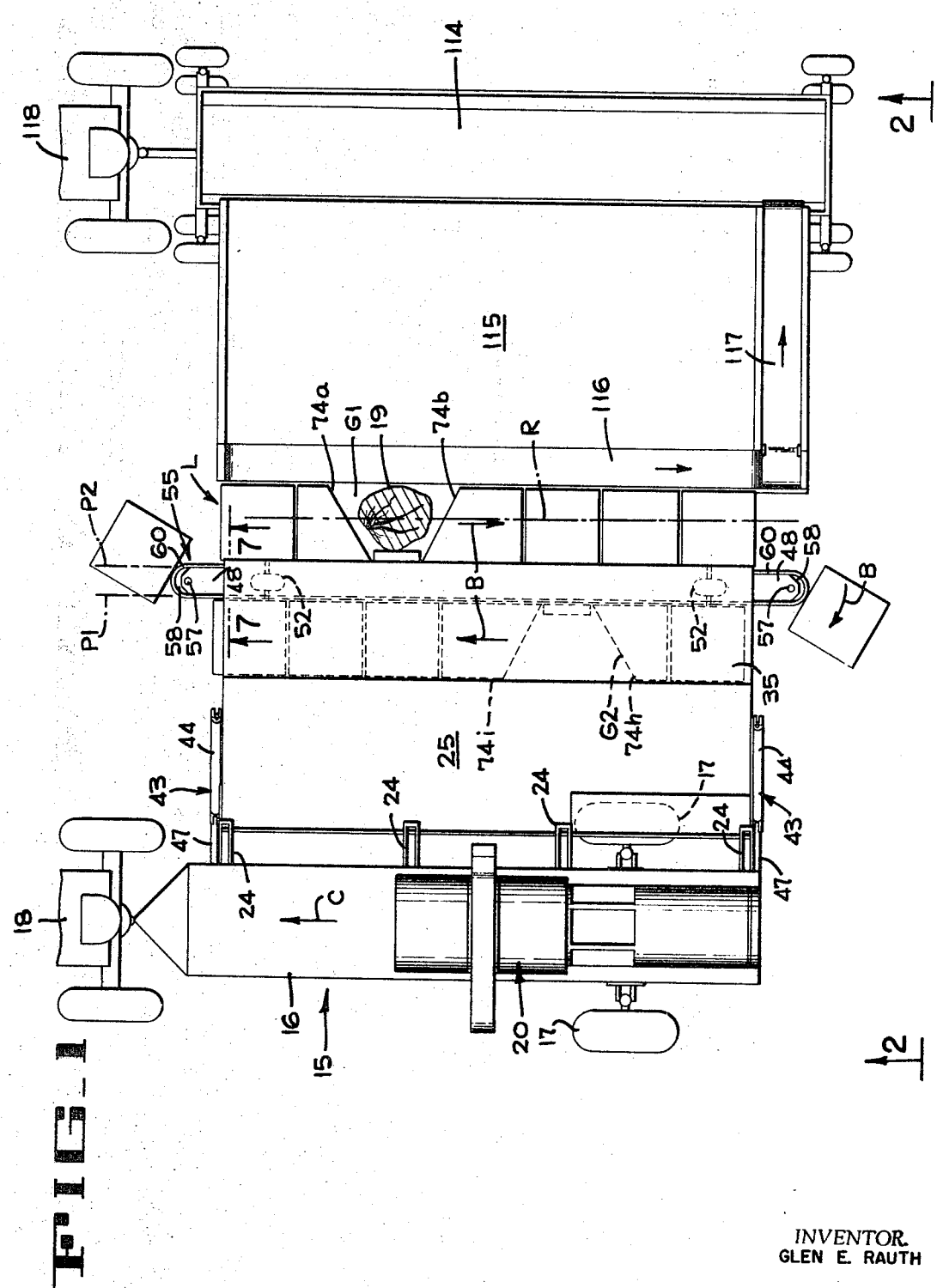
INVENTOR.
GLEN E. RAUTH
BY F.W. Anderson
C.E. Tripp
ATTORNEYS Jan. 12, 1971  G. E. RAUTH  3,553,949
APPARATUS FOR GATHERING CROPS FROM TREES
Filed Jan. 29, 1968  8 Sheets-Sheet 2

INVENTOR.
GLEN E. RAUTH
BY F. W. Anderson
C. E. Tripp
ATTORNEYS

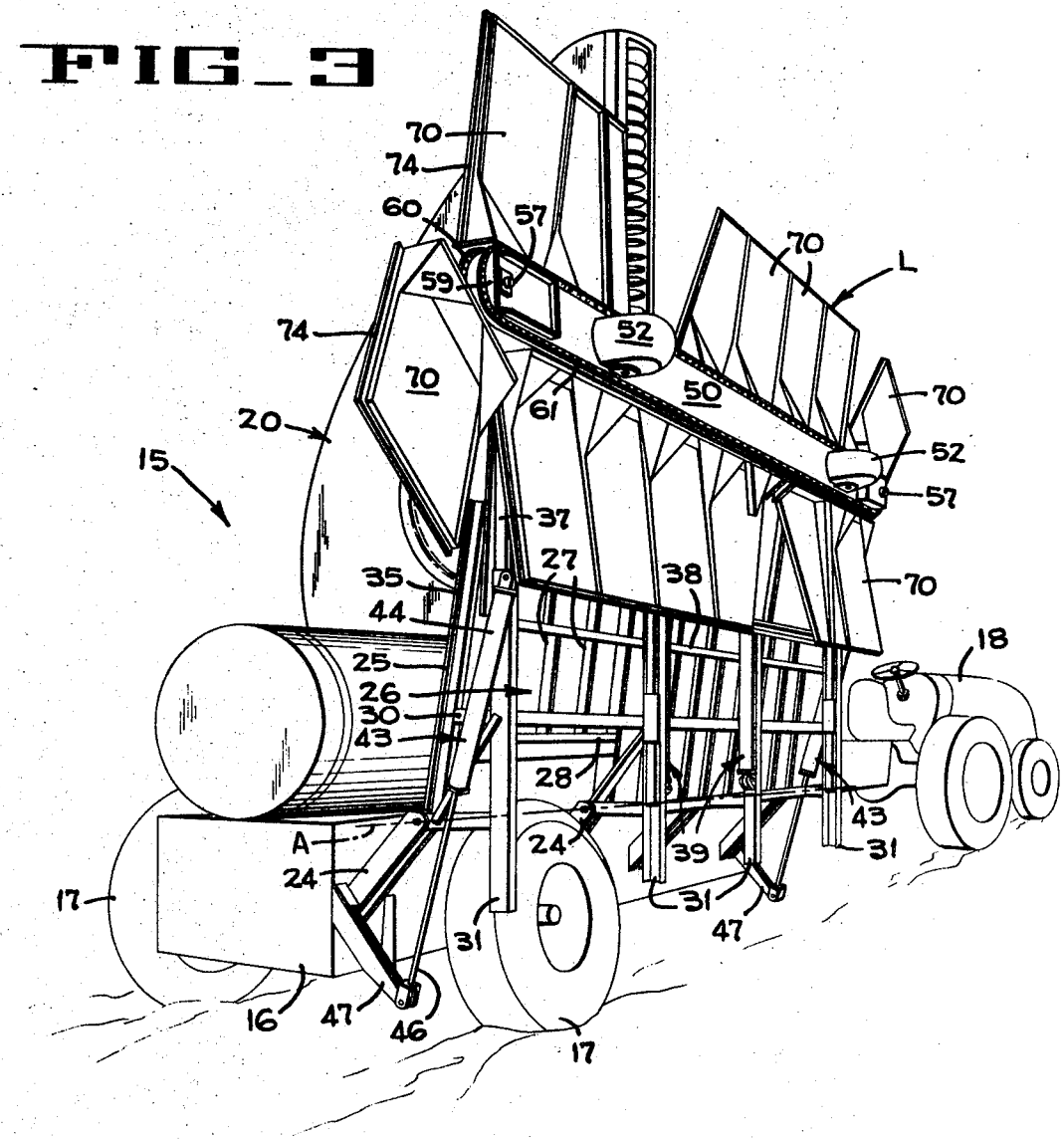

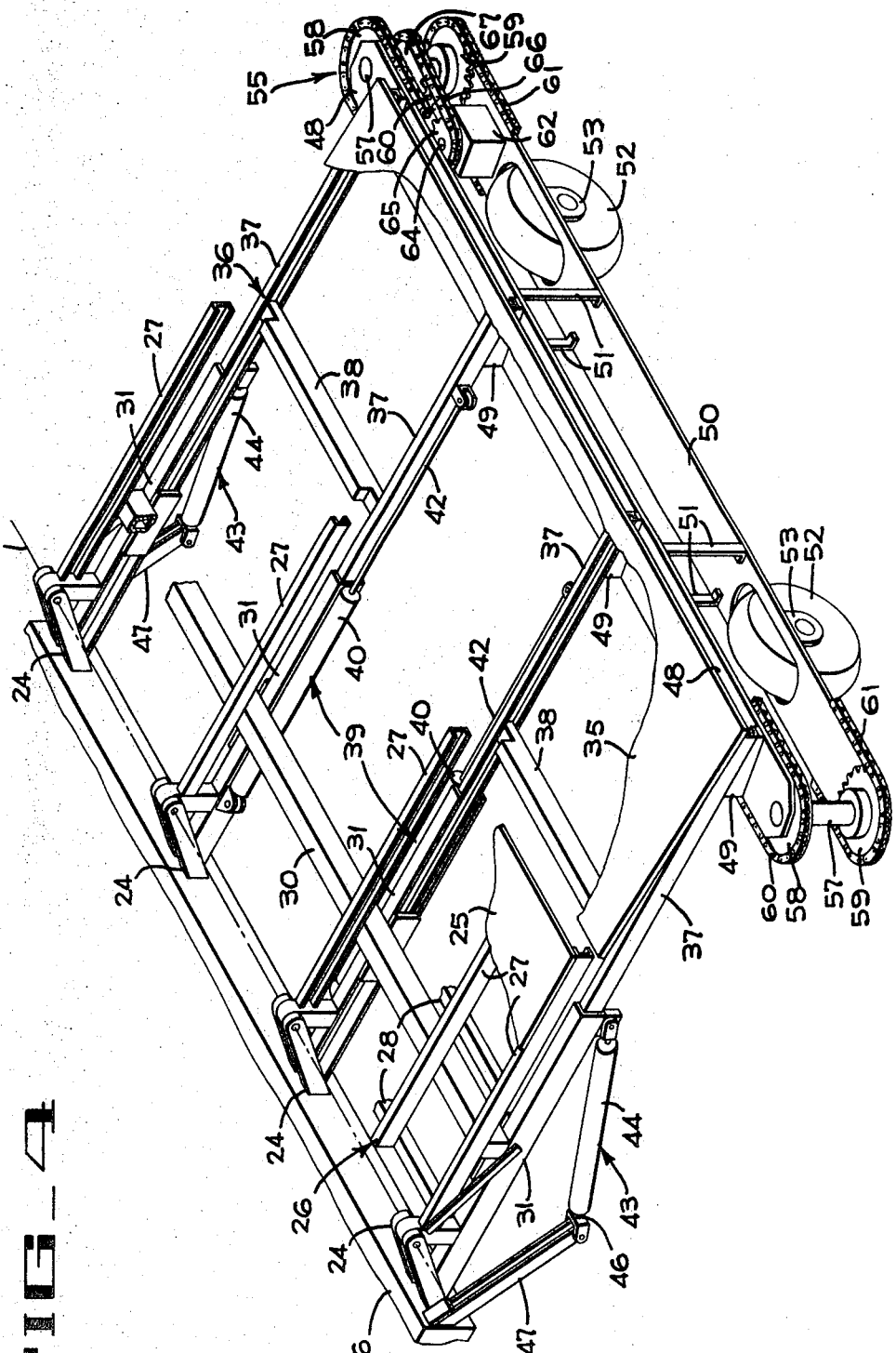

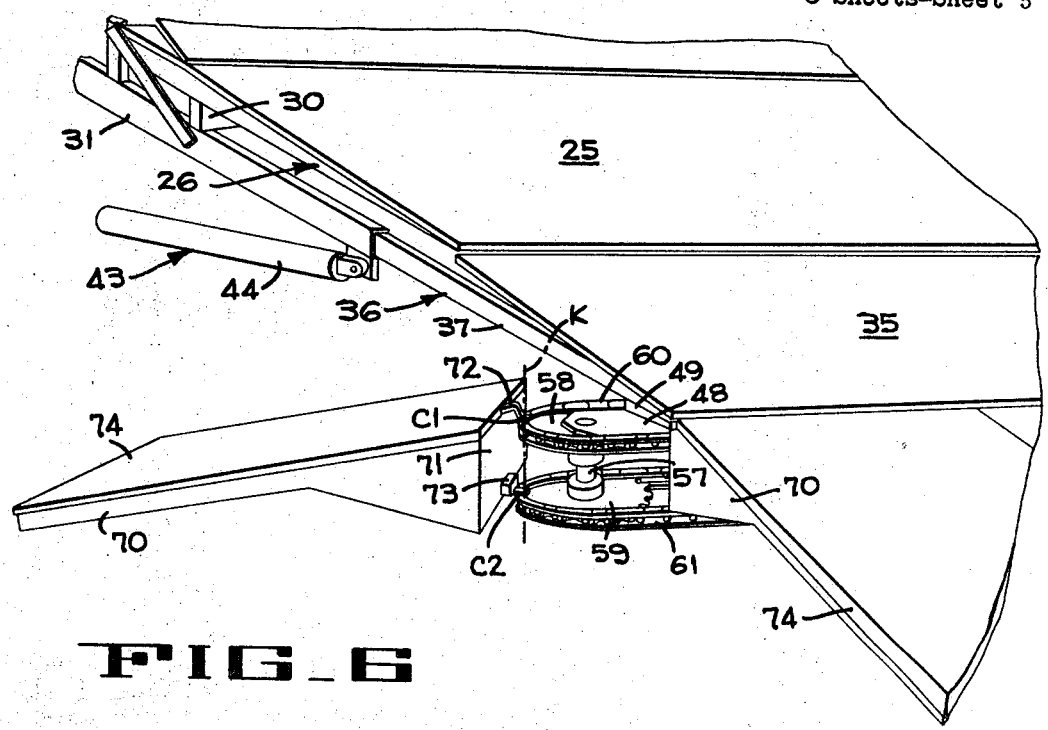
FIG_6
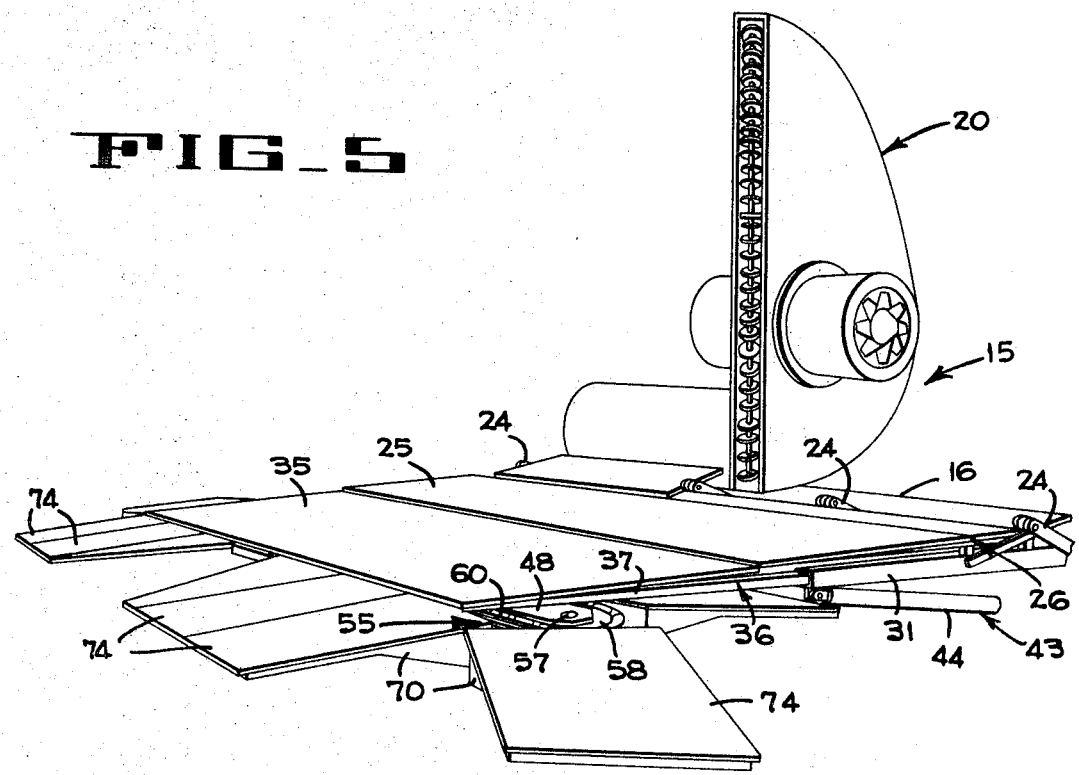
FIG_5
INVENTOR.
GLEN E. RAUTH
ATTORNEYS

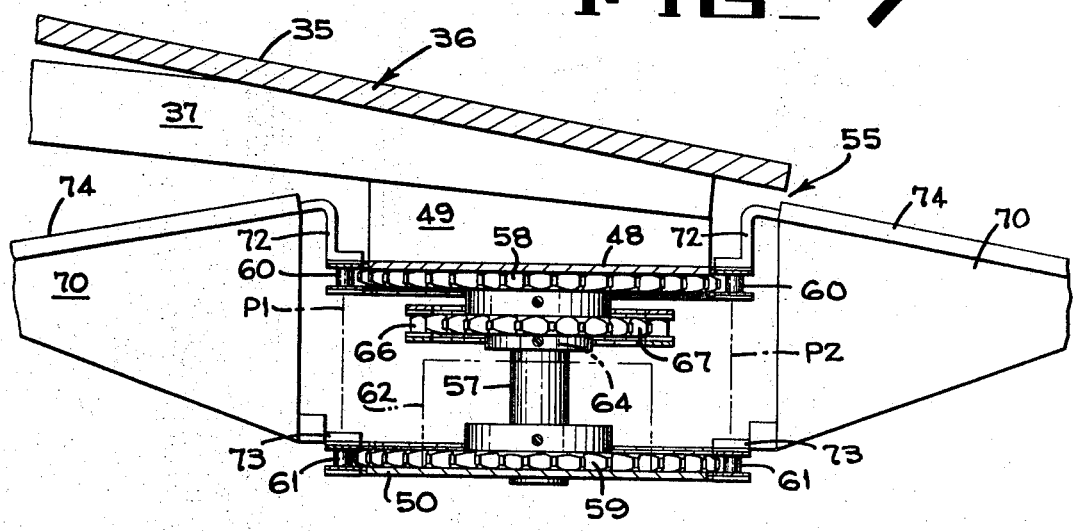
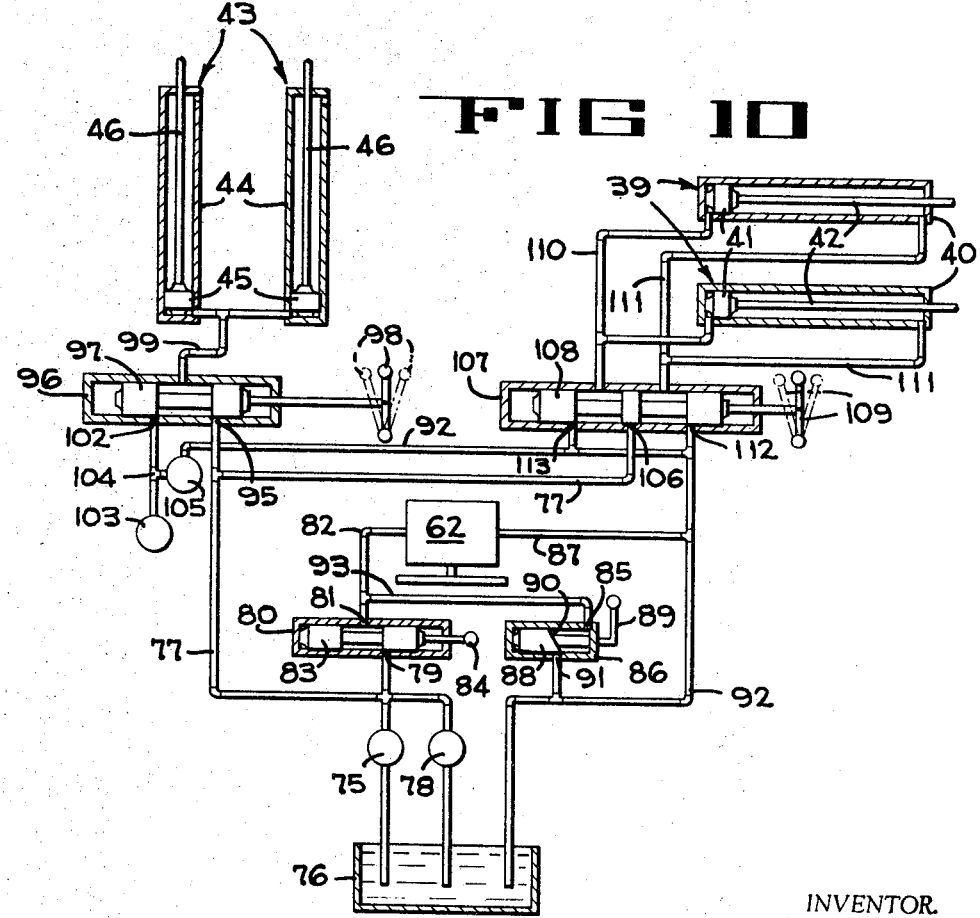

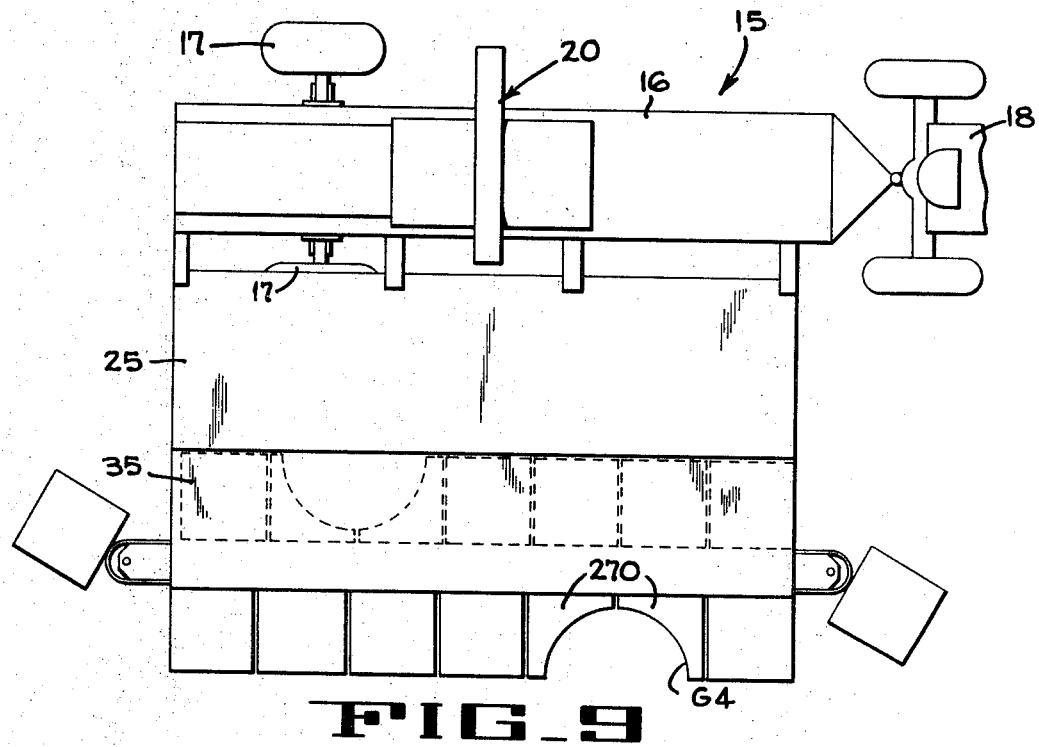
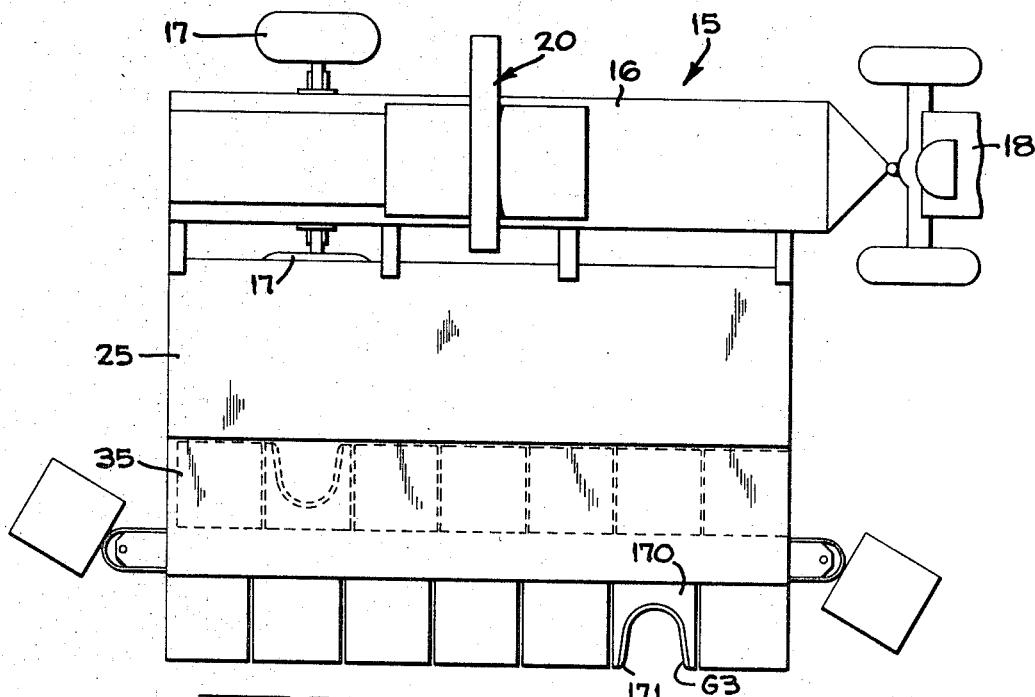

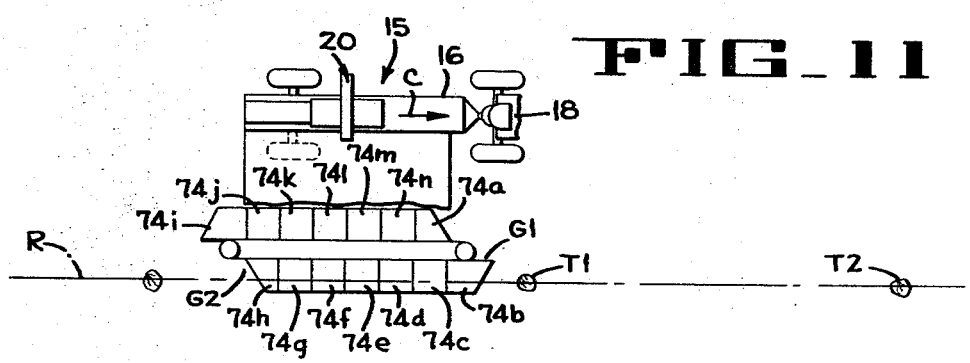
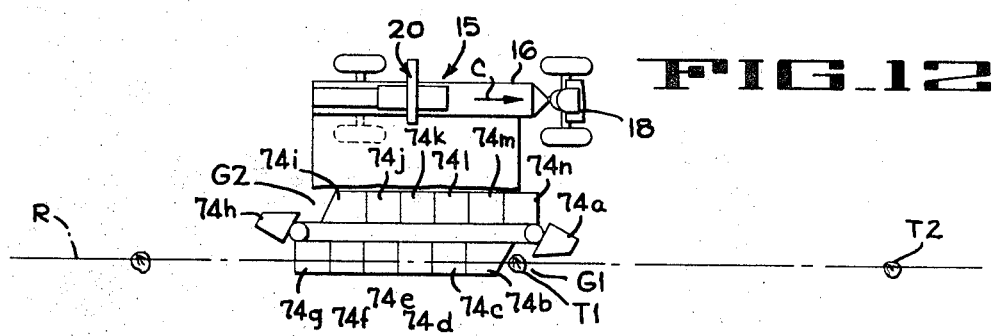
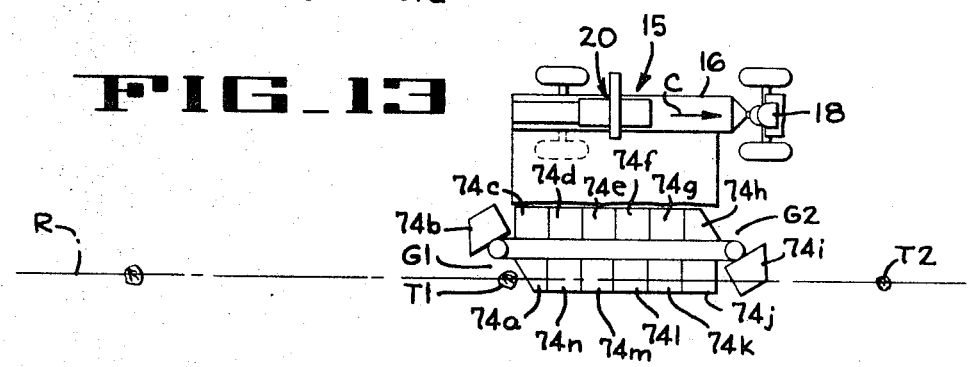
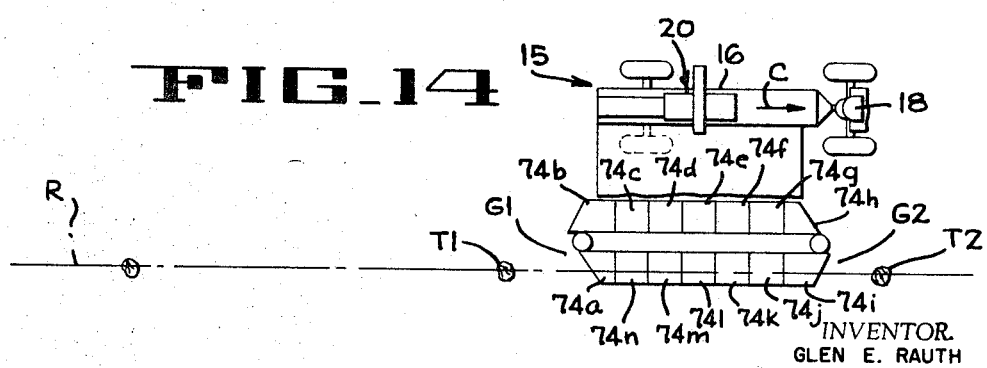

United States Patent Office 3,553,949
Patented Jan. 12, 1971

3,553,949
APPARATUS FOR GATHERING CROPS FROM TREES
Glen E. Rauth, Winter Park, Fla., assignor to FMC Corporation, San Jose, Calif., a corporation of Delaware
Filed Jan. 29, 1968, Ser. No. 701,273
Int. Cl. A01g 19/06
U.S. Cl. 56—329       11 Claims

ABSTRACT OF THE DISCLOSURE

A machine for gathering fruit from trees as it continuously moves past the trees has means to dislodge the fruit from the trees and has a resilient catch frame plate to intercept the fruit as it falls and to guide the fruit to a conveyor. The machine has an endless loop of segmented paneling comprising two runs extending in the direction of travel of the machine, one run underlying the catch plate and moving forwardly on the machine and the other run extending under the tree and moving rearwardly at a rate equal to the ground speed of the machine. This latter run of paneling, which has a gap to receive the tree, remains stationary with respect to the tree so that the paneling embraces the tree as the machine moves past the tree without damage to the paneling.

BACKGROUND OF THE INVENTION

The present invention relates to machines for gathering crops, such as fruit harvesting machines.

One type of fruit harvesting machine shown, for example, in U.S. patent 3,310,231, directs a continuously swerving air blast at successive fruit trees as it moves along a row of trees to dislodge fruit therefrom. Such a machine often has a catch plate thereon to catch the fruit falling from the trees and to guide the fruit onto a conveyor. Usually, a second catch plate carried by another vehicle moves along the trees opposite the first catch plate to assure that the maximum amount of fruit is caught. However, since each of the continuously moving catch plates must terminate short of the trunk of the tree to avoid interference therewith, the catch plates are spaced apart and leave a swath of fruit on the ground which falls between the two catch plates.

SUMMARY OF THE INVENTION

In the present invention apparatus is provided which can move continuously along a row of trees and catch the fruit falling in front of and behind the trunk of each tree without interference with the trunk of the tree. In brief, in the preferred form of the invention, a fruit harvesting machine has an endless loop of segmented paneling, made up of separate, closely spaced, side-by-side panels. The loop has two parallel runs, each extending in the direction of travel of the machine. The loop is power driven so that the inner run, which underlies the catch plate, moves forwardly on the machine and the outer run, which extends beyond the catch plate, moves rearwardly on the machine. The endless loop of paneling is controlled to move at a rate on the machine equaling the ground speed of the machine so that the rearward movement of the outer run of paneling on the machine exactly counteracts the forward speed of the machine. Accordingly, the outer run of paneling remains stationary with respect to the ground (and with respect to the trunk of a tree) while the machine continuously advances along the row of trees.

The paneling has a gap to receive the trunk of a tree therein and, as the machine approaches a tree, the loop of paneling is controlled to bring the gap into registration with the tree. The paneling on either side of the gap, which extends in front of and behind the trunk of that tree, remains stationary with respect to the tree until the machine is past the tree. In other words, the gap in which the tree is received moves rearwardly on the machine as the machine moves forwardly past the tree so that the gap remains stationary with respect to the ground, and with respect to the tree received therein.

A catch plate having a conveyor thereon moves along the opposite side of the row of trees with the outer end closely spaced from the outer run of paneling so that fruit falling on either catch plate, or on the paneling which moves with respect to the machine between the catch plates, rolls onto the conveyor for removal to a vehicle.

It is therefore one object of the present invention to catch in a moving vehicle the maximum amount of crops dislodged from trees. It is another object of the present invention to provide a fruit harvesting machine operable on the run to catch fruit dislodged from fruit trees without interference with the trunk of the trees.

BRIEF DESCRIPTION OF THE DRAWINGS

FIG. 1 is a plan view of a fruit harvesting machine embodying the present invention in operating position;
FIG. 2 is a view taken on the line 2—2 of FIG. 1;
FIG. 3 is a view of the machine of FIG. 1 but in storage or transport position;
FIG. 4 is a fragmentary view in perspective of a portion of the machine of FIG. 1;
FIG. 5 is a view in perspective of the machine of FIG. 1;
FIG. 6 is a fragmentary view in perspective of the machine of FIG. 1 showing the connection of a panel to the drive chains;
FIG. 7 is a view taken on the line 7—7 of FIG. 1;
FIGS. 8 and 9 are plan views, taken as the view of FIG. 1, of two different embodiments, respectively, of the machine of FIG. 1;
FIG. 10 is a schematic diagram of the hydraulic system of the machine of FIG. 1;
FIGS. 11, 12, 13 and 14 show the machine of FIG. 1 as it approaches a first tree in a row, reaches the first tree, leaves the first tree, and approaches a second tree in the row, respectively.

DESCRIPTION OF THE PREFERRED EMBODIMENTS

The machine 15 shown to illustrate the apparatus of the present invention has a frame 16 mounted on wheels 17, as shown in FIGS. 1, 2 and 3. The machine is pulled by a tractor 18, or other agricultural vehicle, beside and parallel to a row R of trees 19 in a fruit orchard. Apparatus 20 to produce a continuously swerving air blast, such as the apparatus shown in U.S. Pat. 3,310,231 issued Mar. 21, 1967 to Lee W. Winiger, is mounted in the frame 16 to direct a stream of air, indicated by arrows 21, at the row of fruit trees to dislodge fruit therefrom as machine 15 moves continuously past the trees.

An inner catch plate 25 is secured to an inner catch plate frame 26 which is pivotally connected on axis A to spaced pairs of brackets 24 rigidly secured to the frame 16. As shown best in FIG. 4, the inner catch plate frame 26 includes spaced, outwardly extending channels 27 connected by intermediate stringers 28 which extend between the channels. Inner catch plate frame 26 is supported by a longitudinal beam 30 which is connected to parallel, outwardly extending channels 31.

An outer catch plate 35 is secured to an outer catch plate frame 36. Frame 36 also has spaced outwardly extending channels 37 and intermediate beams 38 connected between facing channels 37. The channels 37 of the outer catch plate frame 36 are telescopically received in the channels 31 of the inner catch plate frame 26. As shown best in FIGS. 2, 5 and 6, the outer catch plate 35 lies in a different plane than the inner catch plate 25 so that the outer catch plate can be moved under the inner catch plate. When the outer catch plate is in its fully extended position, the inner edge of the outer catch plate is adjacent the outer edge of the inner catch plate.

Two hydraulic rams 39, which are operable when actuated to shift the outer catch plate 35 with respect to the inner catch plate 25, each have a cylinder 40 connected to a channel 31 and each have a piston 41 (see FIG. 10) with a piston rod 42 connected to a channel 37 of the outer catch plate frame 36.

Two hydraulic rams 43, which are operable when actuated to swing the inner catch plate 25 and the outer catch plate 35 about axis A (to the position shown in FIG. 3), each have a cylinder 4 connected to a channel 31 of the inner catch plate frame 26 and each have a piston 45 (see FIG. 8) with a piston rod 46 connected to a pair of brackets 47 connected rigidly to the frame 16 of the machine. When the pistons 45 are retracted to bring the inner catch plate 25 to the lowermost position (as shown in FIG. 2), the inner catch plate inclines downward (at an angle α to the horizontal) as it extends outwardly. When the pistons 41 are extended to shift the outer catch plate section to its outermost position, the outer catch plate also is inclined downwardly (at angle α to the horizotnal) as it extends outwardly.

As shown best in FIG. 4, the outer catch plate frame 36 has a plate 48 which is connected to wedge blocks 49 secured ot the under side of the channels 37 at the outer ends thereof. The blocks 49 hold the plate 48 horizontal when the catch plates are lowered and the outer catch plate extended. The plate 48 extends forwardly and rearwardly (with respect to normal direction of travel during operation) of the outer catch plate 35. A plate 50 is secured in parallel, spaced relation to plate 48 by brackets 51. A shaft 57 is journaled at each end in plates 48 and 50, and each shaft has secured thereon two spaced sprockets 58 and 59, as shown in FIGS. 4, 5 and 6. An endless chain 60 is received on the sprockets 58 and an endless chain 61 is received on the sprockets 59. The two chains 60 and 61 extend the length of the outer catch plate in spaced relation, each having an inner run and an outer run. The two runs of each chain are parallel to each other and parallel to the runs of the other chain. The two inner runs lie in a common vertical plane P1 and the two outer runs lie in a common vertical plane P2 (see FIG. 1).

As shown best in FIGS. 4 and 7, a hydraulic motor 62 is mounted on the plate 50 beneath the plate 48. The motor 62 has a drive shaft 64 extending upwardly between planes P1 and P2 and having sprocket 65 secured thereon. The sprocket 65 receives an endless chain 66 which is received on a sprocket 67 (see FIG. 4) on the shaft 57 in the forward end 55 of the catch plate frame 36. The motor 62 drives the endless chains 60, 61 in unison in the direction indicated by arrows B. As shown best in FIG. 4, two gage wheels 52 are mounted by brackets 53 to plate 50 and extend below the plate to support the catch plate frames above the ground.

A plurality of panel frames 70 are supported in an endless loop L which is driven by the upper and lower drive chains 60 and 61. Each panel frame, as shown best int FIG. 6, has an inner vertical wall 71 which is connected by clips 72, 73 to each of the chains at a single point C1 and C2 respectively. Points C1 and C2 lie in a common vertical line K. Each panel frame supports a panel 74, which are distinguished from each other in the drawings by alphabetical suffixes. The panels 74 incline downwardly (at an angle α with the horizontal) as they extend from the drive chains. As shown in FIG. 5, the inner edge of the panels (that is, the edge nearest the drive chains) lie a short distance below the outer edge of outer catch plate 35.

As the drive chains 60 and 61 are driven by motor 62, the panels, which are closely spaced in side-by-side relation, travel around the loop defined by the chains 60, 61 in the direction of arrows B. The inner run of panels (that is, the panels which at any instant are on the inner side of the loop) travel forwardly, in the same directional sense as movement of the machine 15. The outer run of panels (that is the panels which at any instant are on the outer side of the loop) travel rearwardly, in the opposite directional sense as the movement of the machine 15. The inner and outer runs of panels travel parallel to each other and parallel to the direction of movement of the machine. The inner run of panels travels under the outer catch frame 36 and plate 35; the outer run of panels travels in closely spaced relation to, and outboard of, the outer edge of the outer catch plate 35.

As shown in FIG. 1, there are two interruptions, or gaps, in the loop of paneling, one interruption, or gap, G1 on one side of the loop and the other interruption, or gap, G2 on the other side of the loop. The interruptions, which are large enough to receive the trunk of an orchard tree, are formed by spacing between two adjacent panels and diagonal sides on the adjacent panels. Gap G1 is formed between panels 74a, 74b and gap G2 is formed between panels 74h, 74i. A pad P is mounted on drive chain 60 at the gaps to prevent damage to the machine or the trunk of a tree received in the gap. The two panels 74a, 74b, 74h, 74i on either side of the gaps are preferably made of flexible material, such as rubber, to prevent damage to the paneling or to the trunk of a tree received in the gap in the paneling. The other panels in the loop L, which are all identical, are rigid, rectangular panels.

Alternatively, the gap G3 may be formed in a single panel 170, as shown in FIG. 8. In this alternative construction, padding 171 rims the margin of the gap. Yet another alternative construction is shown in FIG. 9. In this modification, the interruption G4 is defined by circular corner cuts in adjacent panels 270.

The hydraulic circuit for the machine is shown in FIG. 10. A pump 75 draws fluid from sump 76 and delivers it under pressure to pressure line 77. A relief valve 78, connected between the pressure line and the sump, limits the pressure in the pressure line. Pressure line 77 is connected to the pressure port 79 of a shut off valve 80. The motor port 81 of shut off valve 80 is connected by line 82 to one side of hydraulic motor 62. When the movable valve member 83 of valve 80 is in the position shown, the flow of fluid to motor 62 is blocked. When the operator of the machine moves handle 84 axially to shift the valve member 83 to the right of the position shown in FIG. 10, fluid can flow from pressure line 77 through the valve 80 to motor 62. The opposite side of motor 62 is connected to return line 92. A by pass line 93 is connected between line 82 and the inlet port 85 of a throttle valve 86. Throttle valve 86 has a valve member 88 rotatable by handle 89. Rotatable valve member 88 has a sloping face 90 so that exhaust port 91 of the valve will be opened an amount depending on the angular position of valve member 88. Exhaust port 91 of valve 86 is connected to return line 92 which leads to sump 76. Thus, when handle 84 is shifted to the right of the position shown by the operator, fluid will flow through motor 62 at a rate determined by the by pass setting of handle 89. The speed of the motor 62, and hence the speed of travel of panels 70, can be closely controlled by rotation of handle 89. Shifting control handle 84 to the position shown will stop the flow of fluid through motor 62 and stop the travel of the panels 70 on the machine.

The pressure line 77 is connected to the pressure port 95 of a valve 96 having a movable valve member 97 therein. When the valve member 97 is shifted to the right of the position shown by handle 98, fluid under pressure passes through the valve to cylinder line 99. Pressure fluid in line 99 moves the pistons 45 to extend rods 46 and elevate the catch plates for storage or non-operating travel of the machine 15. When valve member 97 is shifted to the left of the position shown, fluid behind the pistons passes through line 99, the valve 96, and discharge port 102 thereof.

A hydraulic accumulator 103 is connected to port 102 by line 104. A relief valve 105 is connected between line 104 and return line 92. When fluid is discharged from cylinders 44 to lower the catch plates to an operating position, the fluid passes into accumulator 103 until a predetermined pressure, determined by the setting of relief valve 105, is reached in the accumulator. The valve member 97 is maintained to the left during operation of the machine so that the accumulator is in continuous communication with cylinders 44. Thus, the pressure in the accumulator supports part of the load of the catch plates and parts connected thereto, the balance of the load being borne by the gage wheels 52.

Pressure line 77 is also connected to pressure port 106 of valve 107, which has a movable valve member 108 therein. When valve member 108 is shifted to the right of the position shown by handle 109, fluid from pressure line 77 flows through the valve to cylinder line 110. This moves pistons 41 to extend rods 42 and extend the outer catch plate 35 from under the inner catch plate section 25. Fluid behind the pistons flows into cylinder line 111, through the valve and discharge port 112 thereof, to return line 92. When the valve member 108 is shifted to the left of the position shown by handle 109, fluid under pressure is introduced to cylinder line 111 to retract rods 42 and bring outer catch plate under the inner catch plate for storage or non-operational travel. Fluid behind the pistons 41 flows through cylinder line 110, valve 107 and discharge port 113 thereof, to return line 92.

In operating the machine 15 in, for example, a fruit orchard, the catch plates are lowered, and the outer catch plate extended, by actuation of valves 96 and 107, until the catch plates are in the positions shown in FIGS. 1 and 2. The paneling loop is moved, by actuation of valve 80, until one of the gaps G1 is at the sprocket adjacent the leading edges of the catch plates as shown in FIG. 11. With the gap in this position, the paneling is stopped. At this time, then, panel 74b is the front panel in the outer run of panels and panel 74a is the front panel in the inner run of panels.

The machine 15 is connected to a tractor on one side of a row R of trees in the orchard. An inclined catch plate 115 (see FIGS. 1 and 2) is connected to another vehicle 114 which is drawn by tractor 118, on the other side of the row R of trees. A horizontal conveyor 116 is connected to the outer end of catch plate 115 to convey fruit received thereon to an elevating conveyor 117. Conveyor 117 lifts fruit from conveyor 116 to vehicle 114.

The apparatus 20 on machine 15 which produces a continuously swerving air blast is actuated, and the two vehicles begin to move along either side of the row R of trees and thereafter move continuously, as indicated by arrows C, until all the trees in the row are harvested. At this time, as shown in FIG. 11, gap G1 in the paneling is at the leading edge of the catch plates and gap G2 is at the trailing edge thereof. As the machine moves toward the tree trunk, the outer run of panels (that is, panels 74b, 74c, 74d, 74e, 74f, 74g, 74h) lie on a collision course with the trunk of the tree. When the leading edge of the outer catch plate reaches the tree T1 in row R, the movement of the paneling on the machine is started by actuation of valve 80. The paneling rotates clockwise (as viewed in FIG. 12) so the gap G1 in the paneling receives the trunk of the tree therein as shown in FIG. 12. Thereafter, the speed of the paneling is controlled by valve 86 so that the paneling moves on the machine at the same speed that the machine 15 moves along the ground (see FIG. 1). Thus, the outer run of paneling, including the paneling which embraces the trunk of the tree, has a net speed of zero with respect to the ground (and with respect to the tree trunk) since the outer run of paneling moves rearwardly on the machine. In other words, the rearward speed of the outer run of paneling with respect to the machine counteracts the forward speed of the machine with respect to the ground so that the outer run of paneling is stationary with respect to the ground and with respect to the tree. It will be seen from FIGS. 11, 12, 13 and 14 that even though the outer run of panels is stationary with respect to the ground, panels from the forward end of the inner run (relative to the directional sense of movement of the machine) are continuously shifting to the forward end of the outer run and panels from hte rearward end of the outer run are continuously swinging about shaft 57 to the rearward end of the inner run.

As the machine 15 moves past tree T1, the blast of air dislodges fruit from the tree which falls on the catch plates on either side of the tree, and on the paneling in front and in back of the tree, as shown in FIG. 2. Fruit rolls from the catch plate onto the conveyor 116 for transport to conveyor 117 and the vehicle 114. Since the paneling is closely adjacent conveyor 116, as shown best in FIG. 1, no fruit can fall therebetween to the ground. Since the paneling closely embraces the trunk of the tree to form a closure system, no fruit can fall to the ground between the paneling and the tree T1.

When the machine is past the tree, and the gap G1 is at the sprockets at the trailing edge of the outer catch plate, as shown in FIG. 13, the tree T1 disengages from the paneling, and valve 80 is actuated to stop movement of the paneling on the machine. At this time the gap G2, which is directly opposite gap G1 in the paneling, is at the sprockets at the leading edge of the outer catch plate, as shown in FIG. 14, and the paneling is in position to engage the next tree T2.

Although the best mode contemplated for carrying out the present invention has been herein shown and described, it will be apparent that modification and variation may be made without departing from what is regarded to be the subject matter of the invention.

Having completed a detailed description of the invention so that those skilled in the art could practice the same, I claim:

1. In a machine movable forwardly along the ground for collecting fruit from trees, a catch frame on said machine to extend into the path of a tree and intercept fruit falling from the tree, and means successively to move said catch frame rearwardly on the machine parallel to forward movement of the machine to prevent collision with the trunk of the tree, to move said catch frame out of the path of the tree, and to move said catch frame forwardly on the machine to encounter the next tree.

2. In a machine movable forwardly along the ground for collecting fruit from trees, a catch frame on said machine to extend under a tree and intercept fruit falling therefrom, means to move said catch frame on the machine in an endless loop, said loop including a linear outer run in the path of the tree along which the catch frame moves rearwardly on the machine to avoid interference with the tree and including an inner run out of the path of the tree along which the catch frame moves forwardly for encountering the next tree.

3. In a machine movable along a path past a tree to remove the crops therefrom, a plurality of movable panels on the machine forming a closure system to intercept the falling crops, said panels defining a gap to receive the trunk of the tree, and means to move the panels in unison along a straight path as the machine advances past the tree to hold the gap stationary with respect to the tree.

4. The mechanism of claim 3 in which the panels adjacent the gap are flexible.

5. In a machine movable forwardly along the ground for collecting crops from trees, paneling on said machine to extend under a tree and straddle the trunk thereof, and means to move said paneling rearwardly on the machine along a straight line parallel to the forward movement of the machine at a rate equal to the forward movement of the machine along the ground to hold the paneling stationary with respect to the trunk of the tree, said paneling moving means advancing the paneling on the machine after each rearward movement of said paneling.

6. In a machine movable forwardly along the ground for collecting crops from trees, the combination comprising a plurality of closely spaced panels in side by side relation to define an endless loop of segmented paneling on said machine, said loop having two parallel runs each extending in the direction of movement of the machine, said segmented paneling having at least one gap to receive the trunk of a tree, means to drive said paneling around said loop at a rate equal to the ground speed of the machine, the paneling on one side of said loop moving forwardly on the machine and the paneling on the other side of said loop moving rearwardly on the machine, said rearwardly moving paneling moving at a speed on the machine to just counteract the forward speed of the machine on the ground to remain stationary with respect to the ground, said stationary paneling extending under a tree with the gap in the paneling receiving the trunk of said tree.

7. In a machine movable forwardly along the ground for collecting crops from trees, a plurality of closely spaced panels in side by side relation to define an endless loop of paneling on said machine, said endless loop of paneling having two straight runs extending parallel to the direction of travel of the machine, the paneling on one of said runs moving forwardly on the machine and the paneling on the other of said runs moving rearwardly on the machine, said paneling having at least one gap in the loop to receive a tree, a portion of the paneling on either side of a tree received in said gap forming a closure system as the machine moves past the tree to intercept crops dislodged from the tree, and means to move said paneling on said machine about said loop with the gap moving rearwardly to counteract the forward movement of the machine along the ground thereby to hold the paneling under the tree stationary with respect to the trunk of the tree.

8. The mechanism of claim 7 in which said machine is movable at varying speeds to provide selected harvesting rates and in which said means to move said paneling is variably controlled to match the selected rate of machine movement.

9. A machine for catching crops from a tree comprising a frame, means to move the frame in a predetermined directional sense past the trunk of the tree, a plurality of panels movably mounted on the frame and arrayed along a path parallel to the direction of movement of the frame, said path aligned with the tree and said panels spaced to define a gap to receive the trunk of the tree, means to move the panels to move said gap on the frame in a directional sense opposite said predetermined directional sense and at the same rate as the movement of the frame past the trunk of the tree, gage wheels mounted on the frame to support the frame above the ground, a hydraulic ram comprising a piston and cylinder mounted on the machine to urge the frame from its supported position, a pressure accumulator connected in circuit with said hydraulic cylinder to act on said piston to help support the frame and reduce the weight load on the gage wheels.

10. In a machine movable forwardly along the ground for collecting crops dislodged from trees, said machine having a frame, a catch member mounted on said frame, said catch member extending laterally beyond the confines of the frame for approaching a tree in the path of the catch member, and means to move said catch member rearwardly on the machine along a linear path parallel to the forward movement of the machine to counteract the forward movement of the machine relative to the ground.

11. In a harvesting machine movable forwardly along the ground for collecting crops dislodged from trees, said machine having a frame, a catch member on said machine extending laterally beyond the confines of said frame for approaching a tree standing in the path of said catch member to intercept crops falling from the tree, and means to move said catch member rearwardly on the machine at a rate equal to the rate of forward movement of the machine along the ground to render the catch member stationary with respect to the ground and to prevent collision of the catch member with the trunk of the tree.

References Cited

UNITED STATES PATENTS

| | | | |
|---|---|---|---|
| 1,883,666 | 10/1932 | Flintjer | 171—61X |
| 3,105,342 | 10/1963 | Hahn et al. | 56—328 |
| 3,145,521 | 8/1964 | Herbst | 56—329 |
| 3,310,231 | 3/1967 | Wininger | 56—328UX |
| 3,321,031 | 5/1967 | Evans | 172—657X |
| 3,399,520 | 9/1968 | Porter | 56—327 |
| 3,420,045 | 1/1969 | Holzmann | 56—330 |

LOUIS G. MANCENE, Primary Examiner

J. N. ESKOVITZ, Assistant Examiner